US011430592B2

(12) United States Patent
Diao et al.

(10) Patent No.: US 11,430,592 B2
(45) Date of Patent: *Aug. 30, 2022

(54) MAGNETIC ELEMENTS OF AMORPHOUS BASED DUAL FREE LAYER STRUCTURES AND RECORDING DEVICES USING SUCH ELEMENTS

(71) Applicant: Western Digital Technologies, Inc., San Jose, CA (US)

(72) Inventors: Zhitao Diao, Fremont, CA (US); Christian Kaiser, San Jose, CA (US); Yuankai Zheng, Fremont, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/185,797

(22) Filed: Feb. 25, 2021

(65) Prior Publication Data

US 2022/0093305 A1 Mar. 24, 2022

Related U.S. Application Data

(60) Provisional application No. 63/082,772, filed on Sep. 24, 2020.

(51) Int. Cl.
*H01F 10/32* (2006.01)
*G11B 5/39* (2006.01)

(52) U.S. Cl.
CPC ....... *H01F 10/3263* (2013.01); *G11B 5/3909* (2013.01); *H01F 10/3204* (2013.01); *H01F 10/3254* (2013.01)

(58) Field of Classification Search
None
See application file for complete search history.

(56) References Cited

U.S. PATENT DOCUMENTS

| 7,161,774 | B2 | 1/2007 | Hayashi et al. |
| 8,456,781 | B2 | 6/2013 | Zhao et al. |
| (Continued) | | | |

OTHER PUBLICATIONS

Z.Diao et al., "Advanced Dual-Free-Layer CPP GMR Sensors for High-Density Magnetic Recording", Journals & Magnetics, IEEE Transactions on Magnetics, vol. 52, Issue 6, Jun. 2016 (8 pages).

*Primary Examiner* — Kevin M Bernatz
(74) *Attorney, Agent, or Firm* — Patterson + Sheridan, LLP; Steven H. VerSteeg

(57) ABSTRACT

A magnetic element includes a first free layer, a barrier layer over the first free layer, and a second free layer over the barrier layer. The first free layer includes a first ferromagnetic bilayer and a first amorphous insertion layer (e.g., CoHf) between the first ferromagnetic bilayer. The first ferromagnetic bilayer is selected from CoB, CoFeB, FeB, and combinations thereof. The second free layer includes a second ferromagnetic bilayer and a second amorphous insertion layer (e.g., CoHf) between the second ferromagnetic bilayer. The second ferromagnetic bilayer is selected from CoB, CoFeB, FeB, and combinations thereof. Each of the first and the second amorphous insertion layer independently can be ferromagnetic or non-ferromagnetic and can have a recrystallization temperature of about 300° C. and above. The magnetic element can further include a non-ferromagnetic amorphous buffer layer and/or a non-ferromagnetic amorphous capping layer. The magnetic element can further include a ferromagnetic amorphous seed layer.

22 Claims, 10 Drawing Sheets

(56) References Cited

U.S. PATENT DOCUMENTS

| | | | |
|---|---|---|---|
| 8,747,629 B2 | 6/2014 | Wang et al. | |
| 8,817,426 B2* | 8/2014 | Gao | G11B 5/3909 |
| | | | 360/324.11 |
| 8,946,834 B2 | 2/2015 | Wang et al. | |
| 8,958,180 B1* | 2/2015 | Park | G11B 5/3912 |
| | | | 360/319 |
| 9,040,178 B2 | 5/2015 | Zhao et al. | |
| 9,166,144 B2 | 10/2015 | Oh et al. | |
| 9,177,573 B1 | 11/2015 | Oh et al. | |
| 9,472,216 B1 | 10/2016 | Mauri et al. | |
| 9,825,217 B1* | 11/2017 | Kim | H01L 43/12 |
| 10,950,260 B1* | 3/2021 | Freitag | G11B 5/3912 |
| 11,170,808 B1* | 11/2021 | Liu | G11B 5/3912 |
| 11,283,006 B1* | 3/2022 | Freitag | H01L 43/10 |
| 2012/0127603 A1* | 5/2012 | Gao | G01R 33/098 |
| | | | 360/75 |
| 2015/0116867 A1* | 4/2015 | Childress | G11B 5/3912 |
| | | | 360/319 |
| 2015/0221326 A1* | 8/2015 | Jung | H01L 43/08 |
| | | | 360/328 |

\* cited by examiner

MAGNETIC ELEMENTS OF AMORPHOUS BASED DUAL FREE LAYER STRUCTURES AND RECORDING DEVICES USING SUCH ELEMENTS

CROSS-REFERENCE TO RELATED APPLICATIONS

This application claims benefit of U.S. Provisional Patent Application Ser. No. 63/082,772, filed Sep. 24, 2020, which is herein incorporated by reference.

BACKGROUND OF THE DISCLOSURE

Field of the Disclosure

Embodiments of the present disclosure generally relate to magnetic elements of dual free layer structures enhanced thermal-mechanically and magnetically with amorphous multilayer structures and recording devices using such elements, such as a read sensor of a read head of a data storage device.

Description of the Related Art

The heart of the functioning and capability of a computer is the storing and writing of data to a data storage device, such as a hard disk drive (HDD). The volume of data processed by a computer is increasing rapidly. There is a need for higher recording density of a magnetic recording medium to increase the function and the capability of a computer.

In order to achieve higher recording densities, such as recording densities exceeding 2 Tbit/in$^2$ for a magnetic recording medium, the width and pitch of write tracks are narrowed, and thus the corresponding magnetically recorded bits encoded in each write track are narrowed. Attempts to achieve increasing requirements of advanced narrow gap reader sensors of read heads to achieve reading of higher recording densities have proposed utilizing tunnel magnetoresistive (TMR) reader sensors with free layers of transition metal Co/Fe alloys containing amorphous elements of Ta, CoFeB, or CoFeBTa. In addition, those reader sensors have been fabricated using conventional single free layers with a special set of pinning structures having antiferromagnetic (AFM) layers for self-exchange bias. Consequently, those reader sensors may suffer in process, device performance, and areal recording density enhancement due to the degraded magnetic pinning layer properties, thermal stability, and the disturbed exchange bias of the AFM layers.

SUMMARY OF THE DISCLOSURE

Embodiments of the present disclosure generally relate to magnetic elements with amorphous layers in dual free layer structures and recording devices using such elements, such as a read sensor of a read head of a data storage device. These amorphous layers have recrystallization temperatures of about 300° C. and above.

In one embodiment, a magnetic element includes a first free layer, a barrier layer, and a second free layer. The first free layer includes a first ferromagnetic bilayer selected from CoB, CoFeB, FeB, and combinations thereof and a first amorphous insertion layer between the first ferromagnetic bilayer. The barrier layer is over the first free layer. The second free layer is over the barrier layer. The second free layer includes a second ferromagnetic bilayer selected from CoB, CoFeB, FeB, and combinations thereof and a second amorphous insertion layer between the second ferromagnetic bilayer. Each of the first and second amorphous insertion layers independently has a recrystallization temperature of about 300° C. and above.

In another embodiment, a magnetic element includes a buffer layer, a first free layer, a barrier layer, a second free layer, and a capping layer. The buffer layer includes a first non-ferromagnetic layer. The first free layer is over the buffer layer. The first free layer includes a first ferromagnetic bilayer selected from CoB, CoFeB, FeB, and combinations thereof and a first amorphous insertion layer between the first ferromagnetic bilayer. The barrier layer is over the first free layer. The second free layer is over the barrier layer. The second free layer includes a second ferromagnetic bilayer selected from CoB, CoFeB, FeB, and combinations thereof; and a second amorphous insertion layer between the second ferromagnetic bilayer. The capping layer is over the second free layer. The capping layer includes a second non-ferromagnetic layer. Each of the first and second amorphous insertion layers independently has a recrystallization temperature of about 300° C. and above.

In still another embodiment, a magnetic element includes a ferromagnetic seed layer, a non-ferromagnetic buffer layer, a first free layer, a barrier layer, a second free layer, and a capping layer. The non-ferromagnetic buffer layer is over the ferromagnetic seed layer. The first free layer is over the buffer layer. The first free layer includes a first ferromagnetic bilayer selected from CoB, CoFeB, FeB, and combinations thereof and a first amorphous insertion layer between the first ferromagnetic bilayer. The barrier layer is over the first free layer. The second free layer is over the barrier layer. The second free layer includes a second ferromagnetic bilayer selected from CoB, CoFeB, FeB, and combinations thereof and a second amorphous insertion layer between the second ferromagnetic bilayer. The capping layer is over the second free layer. The capping layer includes a non-ferromagnetic layer. Each of the first and second amorphous insertion layers independently has a recrystallization temperatures of about 300° C. and above.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
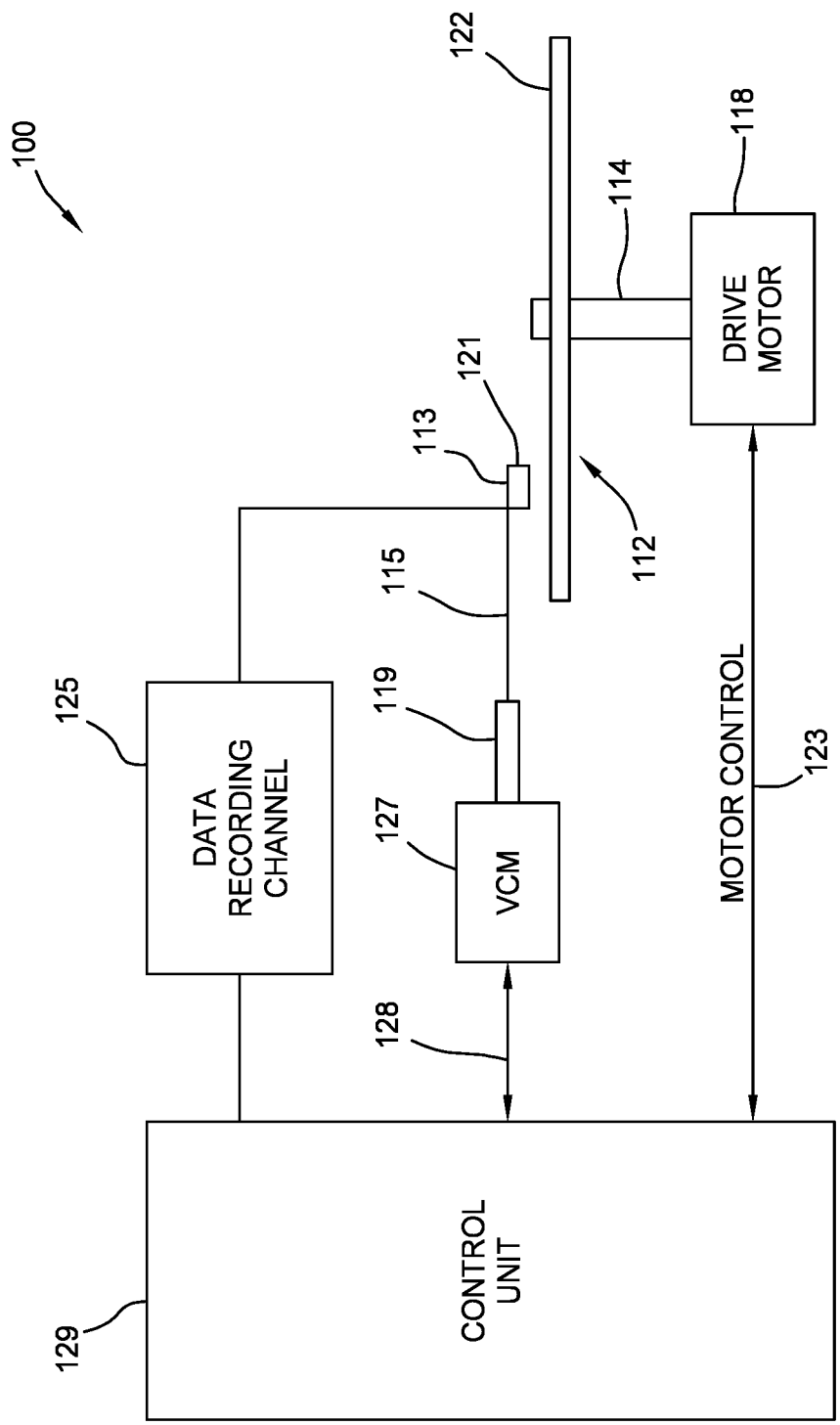
FIG. 1 is a schematic illustration of certain embodiments of a magnetic media drive including a magnetic read head.

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s). Usage in the Summary of the Disclosure or in the Detailed Description of the term "comprising" shall mean comprising, consisting essentially, and/or consisting of.

The term "recrystallization temperature" for a ferromagnetic layer as used herein can be determined as follows: (1) deposit a single magnetic amorphous layer to a thickness of, e.g., 5-10 nm, over a silicon substrate, (2) short anneal the layer for a period of time (e.g., one minute) at a preset temperature and then cool down, (3) measure magnetic properties of the annealed layer, (4) repeat this experimental procedure (1)-(3) at any different elevated temperatures of interest. The temperature in which the amorphous film has shown at a change in coercivity (10%) is deemed the recrystallization temperature.

The term "recrystallization temperature" for a non-ferromagnetic layer as used herein is determined by energy release on heating in differential scanning calorimetry (DSC) or by the change of resistivity on measuring the sheet resistance.

Embodiments of the present disclosure generally relate to magnetic elements with amorphous layers (e.g., cobalt hafnium (CoHf)) in dual free layer structures and recording devices using such elements, such as a read sensor of a read head of a data storage device. These amorphous layers have high recrystallization temperatures of about 300° C. and above.

In certain embodiments, ferromagnetic amorphous insertion layers (e.g., CoHf) between bilayer free layers (FLs) of dual free layer (DFL) reader sensors provide higher magnetic moment (Mst) and TMR signal. In certain aspects, higher magnetic moment and TMR signal are provided without an increase both in coercivity and in magnetostriction. Overall lowered coercivity and magnetostriction contribute to and yield increased process controllability, sensor stabilization, low noise and higher SNR.

In certain embodiments, non-ferromagnetic amorphous insertion layers (e.g., CoHf) between bilayer free layers (FLs) of dual free layer (DFL) reader sensors provide higher TMR signal. The non-ferromagnetic amorphous insertion layers have high-quality and smooth interfaces with the film layers of the magnetic elements providing a higher TMR signal.

In certain embodiments, a non-ferromagnetic amorphous buffer layer (e.g., CoHf) and/or a non-ferromagnetic amorphous capping layer (e.g., CoHf) has a high quality/smooth interface for interfacing with the film layers of the magnetic elements providing a higher TMR signal.

In certain embodiments, a ferromagnetic amorphous seed layer (e.g., CoHf) has a high-quality and smooth interface for interfacing with the film layers of the magnetic elements providing a higher TMR signal.

In certain embodiments as described herein, a higher TMR signal contributes to a larger signal amplitude and/or high signal-to-noise ratio (SNR). In certain embodiments as described herein, an amorphous layer (e.g., CoHf) or has a high recrystallization temperature providing increased thermal stability to the magnetic elements. In certain aspects of certain embodiments, the amorphous layer(s) (e.g., CoHf) provides a high-quality and smooth interface increasing robustness of the magnetic elements. The increased thermal stability and/or the increased robustness provides reduced process corrosion and/or reduced delamination which contributes to low noise, increased SNR, and high process yield.

FIG. 1 is a schematic illustration of certain embodiments of a magnetic media drive 100 including a magnetic write head and a magnetic read head. The magnetic media drive 100 may be a single drive/device or comprise multiple drives/devices. The magnetic media drive 100 includes a magnetic recording medium, such as one or more rotatable magnetic disk 112 supported on a spindle 114 and rotated by a drive motor 118. For the ease of illustration, a single disk drive is shown according to one embodiment. The magnetic recording on each magnetic disk 112 is in the form of any suitable patterns of data tracks, such as annular patterns of concentric data tracks (not shown) on the magnetic disk 112.

It is to be understood that the magnetic recording head discussed herein is applicable to a data storage device such as a hard disk drive (HDD) as well as a tape drive such as a tape embedded drive (TED) or an insertable tape media drive. An example TED is described in patent application titled "Tape Embedded Drive," U.S. application Ser. No. 16/365,034, filed Mar. 31, 2019, assigned to the same assignee of this application, which is hereby incorporated by reference. As such, any reference in the detailed description to a HDD or tape drive is merely for exemplification purposes and is not intended to limit the disclosure unless explicitly claimed. Furthermore, reference to or claims directed to magnetic recording devices are intended to include both HDD and tape drive unless HDD or tape drive devices are explicitly claimed.

It is also to be understood that aspects disclosed herein, such as the magnetoresistive devices, may be used in magnetic sensor applications outside of HDD's and tape media drives such as TED's, such as spintronic devices other than HDD's and tape media drives. As an example, aspects disclosed herein may be used in magnetic elements in magnetoresistive random-access memory (MRAM) devices (e.g., magnetic tunnel junctions as part of memory elements), magnetic sensors or other spintronic devices.

At least one slider 113 is positioned near the magnetic disk 112. Each slider 113 supports a head assembly 121 including one or more read/write heads, such as a write head and such as a read head comprising a magnetic element. As the magnetic disk 112 rotates, the slider 113 moves radially in and out over the disk surface 122 so that the head assembly 121 may access different tracks of the magnetic disk 112 where desired data are written or read. Each slider 113 is attached to an actuator arm 119 by way of a suspension 115. The suspension 115 provides a slight spring force which biases the slider 113 toward the disk surface 122. Each actuator arm 119 is attached to an actuator 127. The actuator 127 as shown in FIG. 1 may be a voice coil motor (VCM). The VCM includes a coil movable within a fixed magnetic field, the direction and speed of the coil movements being controlled by the motor current signals supplied by control unit 129.

During operation of the magnetic media drive 100, the rotation of the magnetic disk 112 generates an air or gas bearing between the slider 113 and the disk surface 122 which exerts an upward force or lift on the slider 113. The air or gas bearing thus counter-balances the slight spring force of suspension 115 and supports slider 113 off and slightly above the disk surface 122 by a small, substantially constant spacing during normal operation.

The various components of the magnetic media drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from the head assembly 121 by way of recording channel 125. Certain embodiments of a magnetic media drive of FIG. 1 may further include a plurality of media, or disks, a plurality of actuators, and/or a plurality number of sliders.

Figure 2:
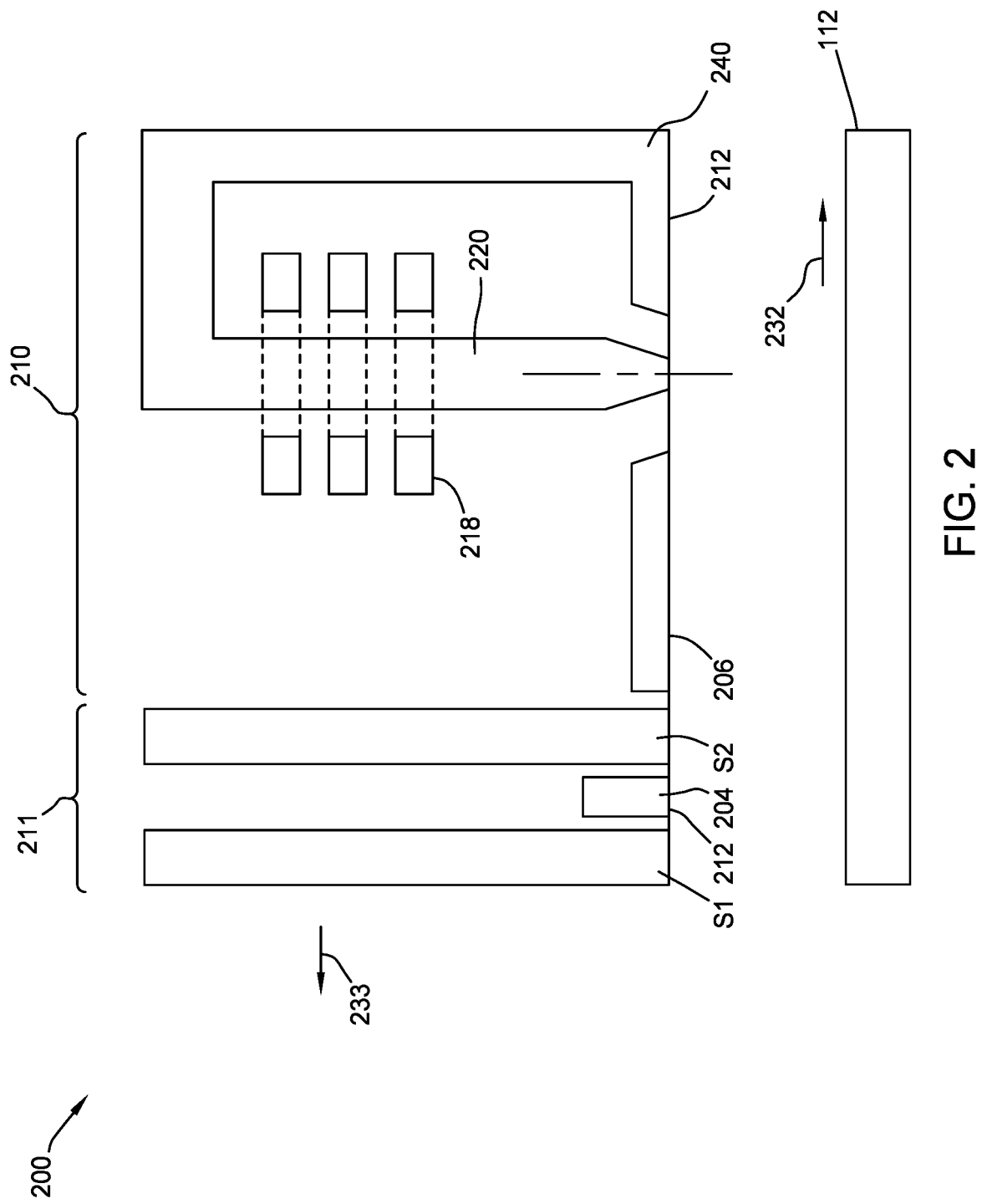
FIG. 2 is a schematic illustration of certain embodiments of a cross sectional side view of a head assembly facing a magnetic storage medium.

FIG. 2 is a schematic illustration of certain embodiments of a cross sectional side view of a head assembly 200 facing the magnetic disk 112 or other magnetic storage medium. The head assembly 200 may correspond to the head assembly 121 described in FIG. 1. The head assembly 200 includes a media facing surface (MFS) 212 facing the magnetic disk 112. As shown in FIG. 2, the magnetic disk 112 relatively moves in the direction indicated by the arrow 232 and the head assembly 200 relatively moves in the direction indicated by the arrow 233.

The head assembly 200 includes a magnetic read head 211. The magnetic read head 211 include a sensing element 204 disposed between shields S1 and S2. The sensing element 204 and the shields S1 and S2 have a MFS 212 facing the magnetic disk 112. The sensing element 204 is a magnetic element sensing the magnetic fields of the recorded bits, such as perpendicular recorded bits or longitudinal recorded bits, in the magnetic disk 112 by a TMR effect. In certain embodiments, the spacing between shields S1 and S2 is about 17 nm or less.

The head assembly 200 may optionally include a write head 210. The write head 210 includes a main pole 220, a leading shield 206, and a trailing shield (TS) 240. The main pole 220 comprises a magnetic material and serves as a main electrode. Each of the main pole 220, the leading shield 206, and the trailing shield (TS) 240 has a front portion at the MFS. The write head 210 includes a coil 218 around the main pole 220 that excites the main pole 220 producing a writing magnetic field for affecting a magnetic recording medium of the rotatable magnetic disk 112. The coil 218 may be a helical structure or one or more sets of pancake structures. The TS 240 comprises a magnetic material, serving as a return pole for the main pole 220. The leading shield 206 may provide electromagnetic shielding and is separated from the main pole 220 by a leading gap 254.

Figure 3:
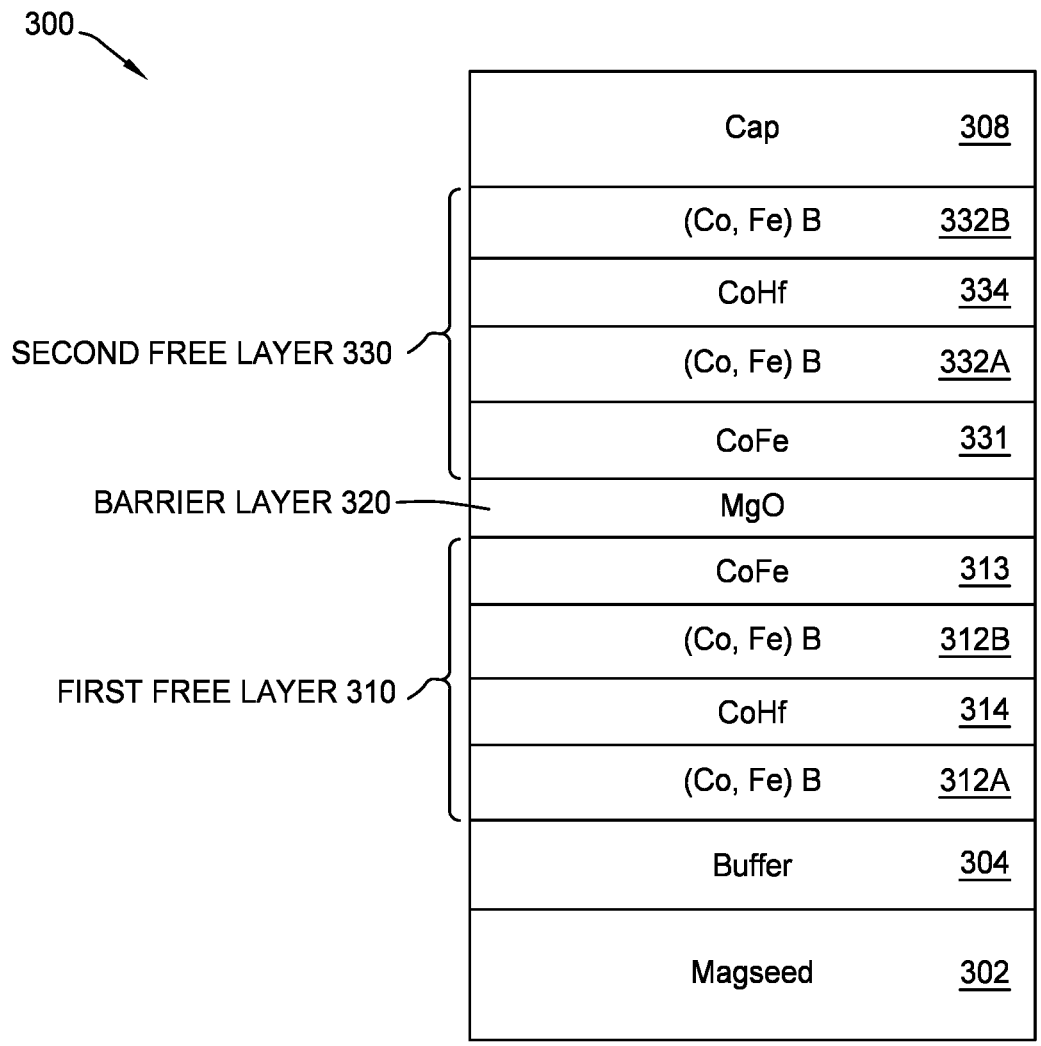
FIGS. 3-5 are schematic illustrations of different embodiments of a magnetic element from an MFS view.

FIG. 3 is a schematic illustration of certain embodiments a magnetic element 300, such as a magnetic element between shields S1 and S2 of the magnetic read head 211 of FIG. 2 or other magnetic read heads, from an MFS view. The magnetic element 300 comprises a dual free layer (DFL) of a first free layer 310 and a second free layer 330 separated by a barrier layer 320, such as an insulating tunneling non-magnetic barrier layer.

The magnetic element 300 can be fabricated by forming a seed layer 302 over a lower shield S1. A buffer layer 304 is formed over the seed layer 302. The first free layer 310 is formed over and proximate the buffer layer 304. The barrier layer 320 is formed over the first free layer 310. The second free layer 330 is formed over the barrier layer 320. A capping layer 308 is formed over the second free layer 330. An upper shield S2 is formed over the capping layer 308 by etching back a part of the capping layer and then by contacting to the etch-backed capping layer.

The first free layer 310 comprises a first set of two or more ferromagnetic layers 312 and comprises a first amorphous CoHf insertion layer 314 between the pluralities of ferromagnetic layers 312. The second free layer 330 comprises a second set of two or more ferromagnetic layers 332 and comprises a second amorphous CoHf insertion layer 334 between the pluralities of ferromagnetic layers 332.

In certain embodiments, the first amorphous insertion layer 314 of the first free layer 310 and the second amorphous insertion layer 334 of the second free layer 330 are ferromagnetic and independently comprises an alloy of one or more transition metals and one or more amorphous forming elements. The transition metal is Co, Fe, Ni, other suitable transition metals, or combinations thereof. The amorphous forming element is Ta, Zr, Hf, W, Ti, C, P, B, Si, Nb, other suitable amorphous forming element, or combinations thereof. The first amorphous insertion layer 314 and the second amorphous insertion layer 334 independently comprises the one or more amorphous forming element in an atomic percent in content from greater than 0% to less than about 30%.

In certain embodiments, the first amorphous insertion layer 314 of the first free layer 310 and the second amorphous insertion layer 334 of the second free layer 330 are non-ferromagnetic and independently comprises one or more amorphous forming element of Ta, Zr, Hf, W, Ti, C, P, B, Si, Nb, other suitable amorphous forming elements, or combinations thereof alone, or alloys with one or more transition metals of Co, Fe, Ni, other suitable transition metals, or combinations of transition metals thereof. The first amorphous insertion layer 314 and the second amorphous insertion layer 334 comprises the amorphous forming element in an atomic percent content from about 30% to about 100%.

In certain embodiments, each of the first amorphous CoHf insertion layer 314 and the second amorphous CoHf insertion layer 334 independently comprises CoHf having an atomic percent of Hf from about 5 to about 95% in content.

Each of the first and second amorphous CoHf insertion layers 314, 334 comprising CoHf is independently an amorphous layer having a high recrystallization temperature of about 300° C. and above. The first and second amorphous CoHf insertion layers 314, 334 respectively provide thermal stability to the first free layer 310 and the second free layer 330 so that the magnetic element 300 can properly operate over a wide temperature range.

In certain embodiments, each of the first amorphous CoHf insertion layer 314 and the second amorphous CoHf insertion layer 334 is ferromagnetic and each independently comprises CoHf having an atomic percent of Hf from about 5 to about 30% in content. In certain embodiments, each of the first and second ferromagnetic amorphous CoHf insertion layers 314, 334 independently has a thickness from about 0.05 nm to about 1.0 nm. In certain embodiments, each of the first and second magnetic amorphous CoHf insertion layers 314, 334 independently has a magnetic moment from about 200 to about 1000 emu/cm$^3$. The ferromagnetic amorphous CoHf insertion layers 314, 334 increase the magnetic moment (Mst) of each of the respective free layers 310, 330 and thus contribute to a higher TMR signal for the DFL in comparison to those without such amorphous insertion layers. The ferromagnetic amorphous CoHf insertion layers 314, 334 increase the magnetic moment of each of the respective free layers 310, 330 without increasing the coercivity and the magnetostriction of the free layer. The amorphous CoHf insertion layer based reader sensor structures in addition have increased adhesion and/or increased thermally stability with reduced corrosion and delamination during post operational processes providing increased reliability of devices. In certain aspects, the low magnetostriction of the amorphous CoHf insertion layers 314, 334 and the DFL with such insertion layers reduces the noise in part of the TMR signal, providing a higher signal-to-noise ratio (SNR) in comparison to those without amorphous CoHf insertion layers. In certain embodiments, the free layer 310 is formed to have a magnetostriction of less than about 5.0 ppm and the core part of DFL reader sensor, including the free layer 310, barrier 320 and the free layer 330, is formed to have an overall magnetostriction of less than about 5.0 ppm.

In certain embodiments, each of the first amorphous CoHf insertion layer 314 and the second amorphous CoHf insertion layer 334 is non-ferromagnetic and independently comprises CoHf having an atomic percent of Hf from more than about 30 to about 95% in content. In certain embodiments, each of the first and second non-ferromagnetic amorphous CoHf insertion layers 314, 334 independently has a thickness from about 0.5 nm or less. In order to control the magnetic moment (Mst) of each of the respective free layers 310, 330, the non-magnetic amorphous CoHf insertion layers 314, 334 are formed thinner in comparison to ferromagnetic amorphous CoHf insertion layers 314, 334. The non-ferromagnetic amorphous CoHf insertion layer based reader sensor structures have similar advantages and benefits as shown in the ferromagnetic amorphous CoHf insertion layers, in addition to the increased adhesion and/or increased thermally stability with reduced corrosion and delamination during post operational processes.

Each of the ferromagnetic layers 312, 332 of the DFL independently comprises a material selected from CoB, FeB, CoFeB, CoFe, Co, Fe, NiFe, or other suitable magnetic materials. Each of the plurality of ferromagnetic layers 312, 332 has the same or different thicknesses. For example, in certain embodiments, each of the plurality of ferromagnetic layers 312, 332 independently has a thickness from about 1.0 nm to about 5.0 nm. In certain embodiments, each of the first free layer 310 and the second free layer 330 comprises a bilayer, in which each sublayer comprises a material selected from CoB, FeB, and CoFeB and combinations thereof, in which the amorphous CoHf insertion layer is between the bilayer. For example, FIG. 3 shows the first free layer 310 comprising a first bilayer 312A-B with a first amorphous CoHf insertion layer 314 therebetween and shows the second free layer 330 comprising a second bilayer 332A-B with a second amorphous CoHf insertion layer 334 therebetween. Each of the sublayers of the bilayer has the same or different boron content, such as a sub-layer comprising an atomic percent of boron (B) from about 5 to about 50% in content. In certain embodiments, the first free layer 310 and the second free layer 330 each comprises a bilayer of CoB sub-layers, in which each of the CoB sub-layers independently has an atomic percent of B from about 5 to about 50% in content.

In certain embodiments, each of the first free layer 310 and the second free layer 330 further comprises a ferromagnetic interface layer 313, 331 between the respective ferromagnetic layers 312B, 332A and the barrier layer 320. Each of the ferromagnetic interface layers 313, 331 independently comprises CoFe, Co, or Fe. In certain embodiments, each of the ferromagnetic interface layers 313, 331 independently comprises CoFe with an atomic percent of Fe from about 5 to about 95% in content. In certain embodiments, each of the ferromagnetic interface layers 313, 331 independently has a thickness from 0.1 nm to about 1.0 nm. The ferromagnetic interface layers 313, 331 are interfacing with the barrier layer 320 and promote the crystalline texture of the barrier layer 320, such as a barrier layer comprising MgO with (001) crystalline texture.

In certain aspects, the amorphous CoHf insertion layers 314, 334 have a smooth interface for interfacing with the respective ferromagnetic layers 312, 332 providing increased adhesion, reduced delamination thereof and a higher TMR signal. In certain embodiments, each of the ferromagnetic layers 312, 332 and the optional ferromagnetic interface layers 313, 331 independently comprises Co or a Co alloy to further enhance device performance of the DFL.

The seed layer 302, the buffer layer 304, and the capping layer 308 can be any suitable material. For example, the ferromagnetic seed layer 302 can comprise a ferromagnetic material to functionally act as part of the lower shield S1. Examples of magnetic materials of the seed layer 302 include NiFe, CoFe, CoFeB, other magnetic materials, and combinations thereof. For example, the buffer layer 304 can comprise a non-ferromagnetic material that separates the DFL from the magnetic seeds which contacts in turn with the lower shield S1. Examples of non-ferromagnetic materials include single or multiple layers of a material selected from a list of normal non-magnetic element, such as Ta, Ti, Cr, Ru, Hf, Al, Cu, Ag, Au, W, and combinations thereof, such as a buffer layer of Ta/Ru. The barrier layer 320 can comprise an electrically insulating material of MgO, AlO$_x$, TiO$_x$, or other suitable electrically insulating materials. In certain embodiments, the barrier layer 320 is formed to a thickness of about 1.0 nm or less. In certain embodiments, the barrier layer is MgO due to the promotion of (001) texture from the optional interface layers 313, 331. The capping layer 308 can comprise a non-ferromagnetic material that separates the dual free layer from the upper shield. Examples of non-ferromagnetic materials include single or multiple layers of a material selected from a list of normal non-magnetic element, such as Ta, Ti, Cr, Ru, Hf, Al, Cu, Ag, Au, W, and combinations thereof, such as a capping layer of Ru/Ta or Ru/Ta/Ru.

Figure 4:
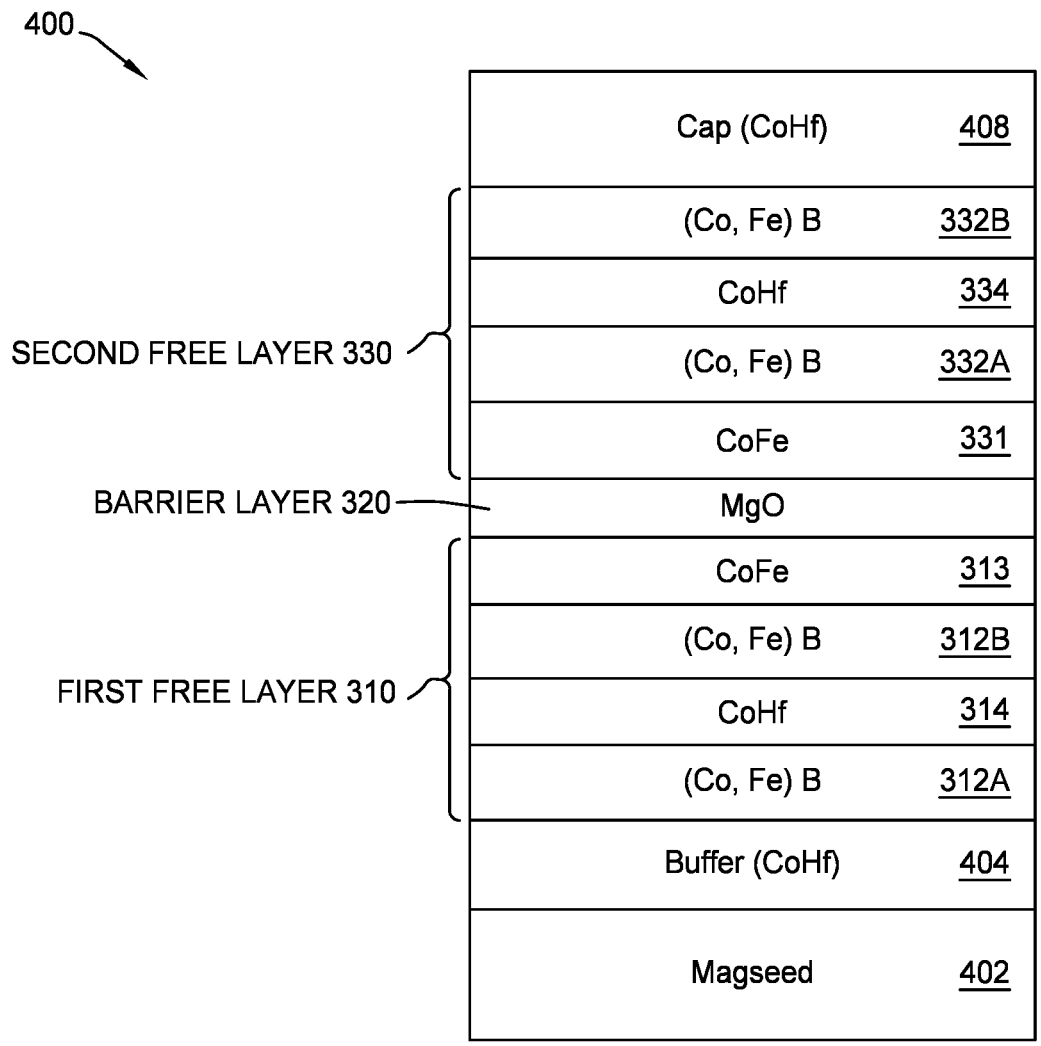

FIG. 4 is a schematic illustration of certain embodiments of a magnetic element 400, such as a magnetic element between the shields S1 and S2 of the magnetic read head 211 of FIG. 2 or other magnetic read heads, from an MFS view. The magnetic element 400 comprises embodiments of the DFL of the first free layer 310 and the second free layer 330 of magnetic element 300 of FIG. 3. The magnetic element 400 further comprises a buffer layer 404 and/or a capping layer 408, both comprising non-ferromagnetic amorphous CoHf.

In certain embodiments, each of the buffer layer 404 and the capping layer 408 is non-ferromagnetic and independently comprises one or more amorphous forming elements of Ta, Zr, Hf, W, Ti, C, P, B, Si, Nb, other suitable amorphous forming elements, or combinations thereof alone or alloys with one or more transition metals of Co, Fe, Ni, other suitable transition metals, or combinations of transition metals thereof. The buffer layer 404 and the capping layer 408 independently comprises the one or more amorphous forming elements in an atomic percent content from about 30% to about 100%.

In certain embodiments, the buffer layer 404 layer comprises non-ferromagnetic CoHf having an atomic percent of Hf from more than about 30 to about 95% in content. The buffer layer 404 comprising non-ferromagnetic CoHf is an amorphous layer having a high recrystallization temperature of about 300° C. and above. The buffer layer 404 comprises a non-ferromagnetic CoHf layer alone or in combination with other non-ferromagnetic layers, such as Ta, Ti, Cr, Ru, Hf, Al, Cu, Ag, Au, W, alloys or multiple layers thereof. In certain embodiments, the buffer layer 404 comprises non-ferromagnetic CoHf forming a high quality and smooth interface with the ferromagnetic layer 312A of the first free layer 310.

In certain embodiments, the capping layer 408 comprises non-ferromagnetic CoHf with an atomic percent of Hf from more than about 30 to about 95% in content. The capping layer 408 comprising non-ferromagnetic CoHf is an amorphous layer having a high recrystallization temperature of about 300° C. and above. The capping layer 408 comprises a non-ferromagnetic CoHf layer alone or in combination with other non-ferromagnetic layers, such as Ta, Ti, Cr, Ru, Hf, Al, Cu, Ag, Au, W, alloys or multiple layers thereof. For example, one embodiment of the capping layer 408 is a non-ferromagnetic CoHf layer on the second free layer 330 and a Ru/Ta layer on the non-ferromagnetic CoHf layer. In certain embodiments, the capping layer 408 comprises smooth non-ferromagnetic CoHf forming a high quality interface with the ferromagnetic layer 332B of the second free layer 330.

In certain aspects, the non-ferromagnetic amorphous CoHf buffer layer 404 and the non-ferromagnetic amorphous CoHf capping layer 408 have a smooth interface for interfacing with respective free layers 310, 330 providing increased adhesion and/or reduced delamination thereof and/or providing a higher TMR signal. In certain aspects, the non-ferromagnetic amorphous CoHf buffer layer 404 and the capping layer 408 increase the thermal stability of the DFL. In certain embodiments, each of the ferromagnetic layers 312, 332 and the optional ferromagnetic interface layers 313, 331 independently contains Co to further enhance device performance of the DFL.

Figure 5:
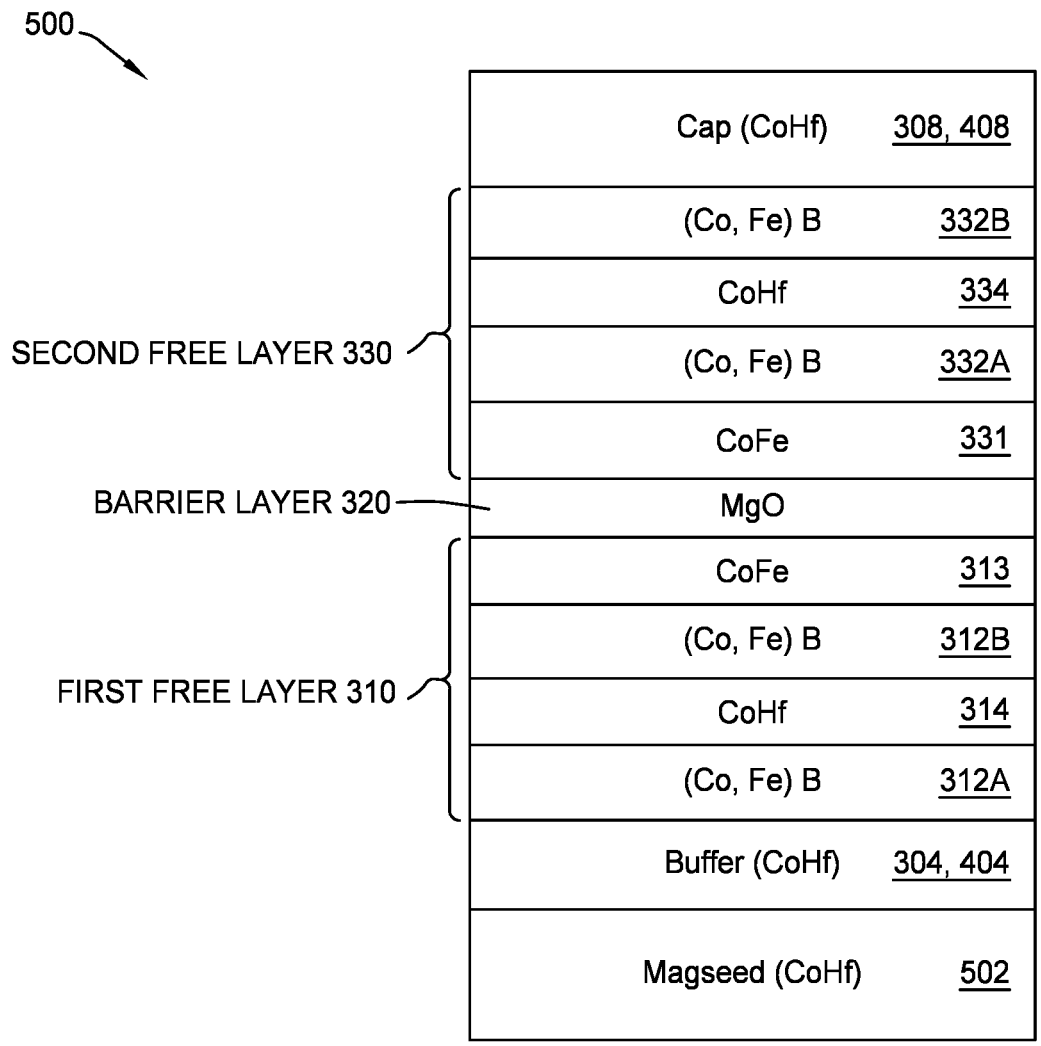

FIG. 5 is a schematic illustration of certain embodiments of a magnetic element 500, such as a magnetic element between the shields S1 and S2 of the magnetic read head 211 of FIG. 2 or other magnetic read heads, from an MFS view. The magnetic element 500 comprises the embodiments of the DFL of the first free layer 310 and the second free layer 330 of magnetic element 300 of FIG. 3 with or without embodiments of the buffer layer 404 and capping layer 408 of magnetic element 400 of FIG. 4.

In certain embodiments, the magnetic element 500 further includes a seed layer 502. The buffer layer 304, 404 is over the seed layer 502. The seed layer 502 is ferromagnetic and comprises an alloy of one or more transition metals and one or more amorphous forming elements. The transition metal is Co, Fe, Ni, other suitable transition metals, or combinations thereof. The amorphous forming element is Ta, Zr, Hf, W, Ti, C, P, B, Si, Nb, other suitable amorphous forming element, or combinations thereof. The seed layer 502 comprises one or more amorphous forming element in an atomic percent in content from more than 0% to less than about 30%.

In certain embodiments, the seed layer 502 comprising a ferromagnetic CoHf having an atomic percent of Hf from about 5 to about 30% in content. The seed layer 502 comprising ferromagnetic CoHf, and is an amorphous layer having a high recrystallization temperature of about 300° C. and above. The seed layer 502 comprises a ferromagnetic CoHf layer alone or in combination with other ferromagnetic layers, such as NiFe, CoFe, CoFeB, other ferromagnetic materials, or multiple layers thereof.

In certain aspects, the seed layer 502 has a smooth interface for interfacing with the buffer layer 304, 404 providing increased adhesion and/or reduced delamination thereof and/or providing a higher TMR signal. In certain aspects, the seed layer 502 increases the thermal stability of the DFL. In certain embodiments, each of the ferromagnetic layers 312, 332 and the ferromagnetic interface layers 313, 331 independently contains Co to further enhance device performance of the DFL.

Figure 6:
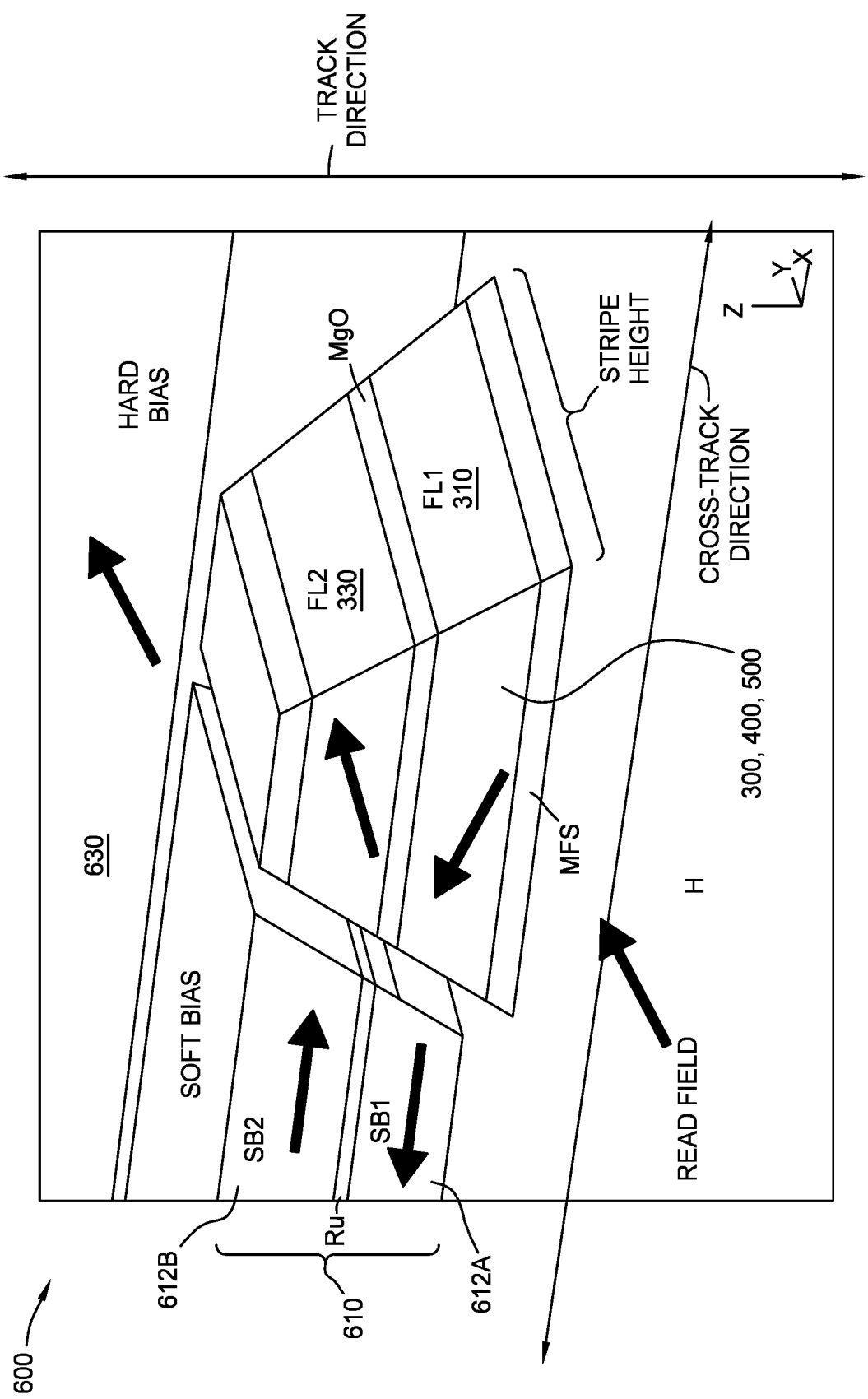
FIG. 6 is a schematic illustration of a perspective view of certain embodiments of a read sensor including a magnetic element.

FIG. 6 is a schematic illustration of a perspective view of certain embodiments of a read sensor 600 including magnetic elements 300, 400, 500 of FIG. 3, FIG. 4, or FIG. 5. The read sensor 600 includes two sets 610 of anti-ferromagnetically coupled soft bias (SB) stacks 612A-B (one set is shown in FIG. 6) at each side of the magnetic element in a cross-track direction. The read sensor 600 includes a hard magnet 630 located at the rear of the magnetic element. The two sets 610 of SB stacks 612A-B set the easy magnetization direction of the first free layer 310 about 90 degrees with respect to the easy magnetization direction of the second free layer 330. In the presence of a magnetic read field, oriented about perpendicular to the plane of the MFS, the magnetization directions move to be either more parallel to one another away from the MFS or more antiparallel toward the MFS. As the magnetization directions become more parallel to one another the electrical resistance of the sensor decreases. As the magnetization directions become closer to antiparallel to one another, the electrical resistance of the sensor increases. The hard magnet 630 provides a hard bias so that the magnetic response of the sensor is within or near a linear region of the transfer curve. In other embodiments, the magnetic elements 300, 400, 500 can be shaped and incorporated with other soft bias and/or hard bias elements to form a read sensor. In other embodiments, the magnetization directions of the DFL can be set non-symmetrically.

The magnetic elements 300, 400, 500 of FIG. 3, FIG. 4, or FIG. 5 are described herein as comprising a "layer." It is understood that as used herein, the term "layer" means a single layer or multiple sub-layers. For example, a metal alloy layer can be one or more sub-layers comprising a metal alloy, can be multiple sub-layers of single metals, or combinations thereof. Although some of the embodiments are described in reference to a DFL device, in other embodiments, the insertion layers, buffer layers, capping layers, and seed layers can be applicable to a single free layer device. Although the some embodiments are descried in reference to a TMR device, in other embodiments, the free layers, insertion layers, buffer layers, capping layers, and seed layers can be applicable to giant magnetoresistive (GMR) devices as well.

In certain embodiments, amorphous insertion layers (e.g., CoHf) between bilayer free layers (FLs) of dual free layer (DFL) reader sensors provide higher TMR signal, increased magnetic moment (Mst), high TMR signal-to-noise (SNR), and/or low magnetostriction. The amorphous insertion layers (e.g., CoHf) can be ferromagnetic in certain embodiments or can be non-ferromagnetic in certain embodiments. In certain embodiments, a non-ferromagnetic amorphous buffer layer (e.g., CoHf) and/or a non-ferromagnetic amorphous capping layer (e.g., CoHf) has a smooth interface for interfacing with the film layers of the magnetic elements providing increased adhesion and/or reduced delamination thereof and/or providing a higher TMR signal. In certain embodiments, a ferromagnetic amorphous seed layer (e.g., CoHf) has a smooth interface for interfacing with the film layers of the magnetic elements providing increased adhesion and/or reduced delamination thereof and/or providing a higher TMR signal. In certain aspects, the amorphous layer(s) (e.g., CoHf) has a high recrystallization temperature of about 300° C. and above, providing thermal stability to the magnetic element.

In one embodiment, a magnetic element includes a first free layer, a barrier layer, and a second free layer. The first free layer includes a first ferromagnetic bilayer selected from CoB, CoFeB, FeB, and combinations thereof and a first amorphous insertion layer between the first ferromagnetic bilayer. The barrier layer is over the first free layer. The second free layer is over the barrier layer. The second free layer includes a second ferromagnetic bilayer selected from CoB, CoFeB, FeB, and combinations thereof and a second amorphous insertion layer between the second ferromagnetic bilayer. Each of the first and second amorphous insertion layers independently has a recrystallization temperature of about 300° C. and above.

In another embodiment, a magnetic element includes a buffer layer, a first free layer, a barrier layer, a second free layer, and a capping layer. The buffer layer includes a first non-ferromagnetic layer. The first free layer is over the buffer layer. The first free layer includes a first ferromagnetic bilayer selected from CoB, CoFeB, FeB, and combinations thereof and a first amorphous insertion layer between the first ferromagnetic bilayer. The barrier layer is over the first free layer. The second free layer is over the barrier layer. The second free layer includes a second ferromagnetic bilayer selected from CoB, CoFeB, FeB, and combinations thereof; and a second amorphous insertion layer between the second ferromagnetic bilayer. The capping layer is over the second free layer. The capping layer includes a second non-ferromagnetic layer. Each of the first and second amorphous insertion layers independently has a recrystallization temperature of about 300° C. and above.

In still another embodiment, a magnetic element includes a ferromagnetic seed layer, a non-ferromagnetic buffer layer, a first free layer, a barrier layer, a second free layer, and a capping layer. The non-ferromagnetic buffer layer is over the ferromagnetic seed layer. The first free layer is over the buffer layer. The first free layer includes a first ferromagnetic bilayer selected from CoB, CoFeB, FeB, and combinations thereof and a first amorphous insertion layer between the first ferromagnetic bilayer. The barrier layer is over the first free layer. The second free layer is over the barrier layer. The second free layer includes a second ferromagnetic bilayer selected from CoB, CoFeB, FeB, and combinations thereof and a second amorphous insertion layer between the second ferromagnetic bilayer. The capping layer is over the second free layer. The capping layer includes a non-ferromagnetic layer. Each of the first and second amorphous insertion layers independently has a recrystallization temperatures of about 300° C. and above.

EXAMPLES

The Examples are not meant to limit the scope of the claims unless expressly recited as part of the claims.

Example 1

Figure 7:
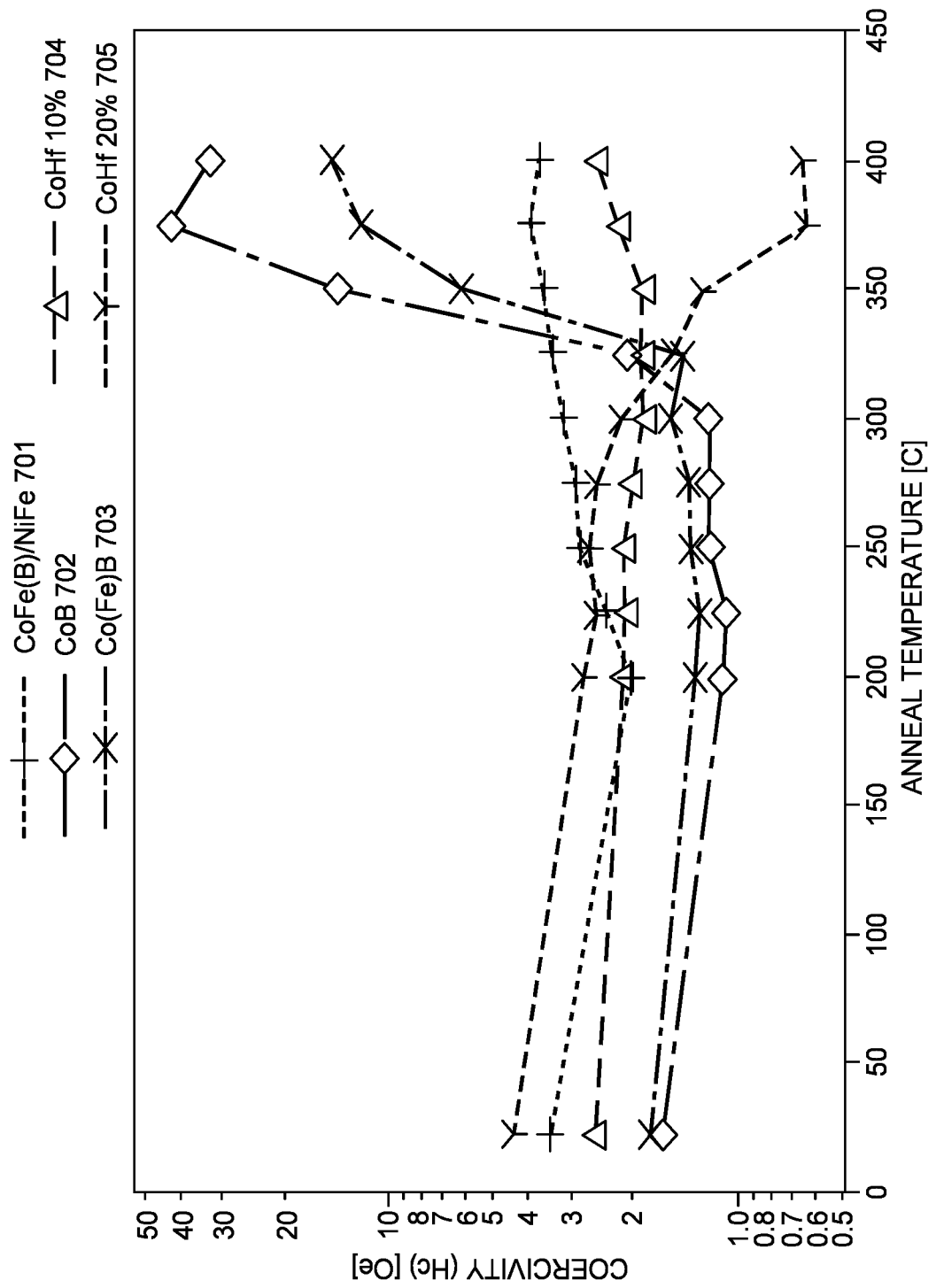
FIG. 7 is a chart of the coercivity Hc of samples of various free layer stacks or film layers after a series of rapid thermal annealing.

The coercivity Hc (Oe) was measured of samples of various free layer stacks or film layers after a series of short thermal annealing for one minute at various temperature and plotted in FIG. 7.

Sample 701 was a multilayer structure free layer of CoFe(B)/NiFe. Sample 702 was a single CoB free layer having about 20 atomic percent of B in content. Sample 703 was a single Co(Fe)B free layer having about 10 to 60 atomic percent of Fe and about 20 atomic percent of B in content. Sample 704 included a single magnetic CoHf free layer having a thickness of 7.5 nm and containing about 10 atomic percent of Hf in content. Sample 705 included a single magnetic CoHf free layer having a thickness of 7.5 nm and containing about 20 atomic percent of Hf in content.

All of the samples, except sample 701, showed that their free layer stacks were amorphous with low coercivity as deposited. All of the samples showed that each of the free layer stacks was thermally stable and continued to be with low coercivity at anneal temperatures of less than 300° C.

Sample 701 of the multilayer structure free layer with a majority of crystallization became thermally unstable and continued to increase in coercivity with anneal temperatures ramped up above 200° C.

Sample 702 of the ferromagnetic amorphous CoB free layer and Sample 703 of the ferromagnetic amorphous Co(Fe)B free layer showed that each of the free layers became thermally unstable and crystallized rapidly with substantially increased coercivity at anneal temperatures from about 300° C. to about 400° C.

Sample 704 of the ferromagnetic amorphous CoHf free layer having about 10 atomic percent of Hf in content showed that the free layer was thermally stable and continued to be amorphous mostly with low coercivity at anneal temperatures from about 300° C. to about 400° C.

Sample 705 of the ferromagnetic amorphous CoHf free layer having about 20 atomic percent of Hf in content showed that the free layer was thermally stable and continued to be amorphous with low coercivity at anneal temperatures from about 300° C. to about 400° C. The ferromagnetic amorphous CoHf20 layer unexpectedly showed a decrease in coercivity at anneal temperatures from about 300° C. to about 400° C. One skilled in the art would have predicted that the coercivity would be about the same or higher at anneal temperatures from about 300° C. to about 400° C., but would also got decreased if there occurred a dispersion in anisotropies that should not be a measure of thermal stability in origin as described above.

Coercivity is the amount of force required to rotate the magnetic domains of a ferromagnetic material. It shows a property of increasing rapidly with gradual or fast recrystallization of amorphous materials. A material with low coercivity that is stable at various anneal temperatures shows that the material has good reliability for use in a free layer due to its thermal stability. The ferromagnetic amorphous CoHf layers stabilized the coercivity and/or delayed the progress and process of crystallization at anneal temperatures from about 300° C. to about 400° C.

Example 2

Figure 8:
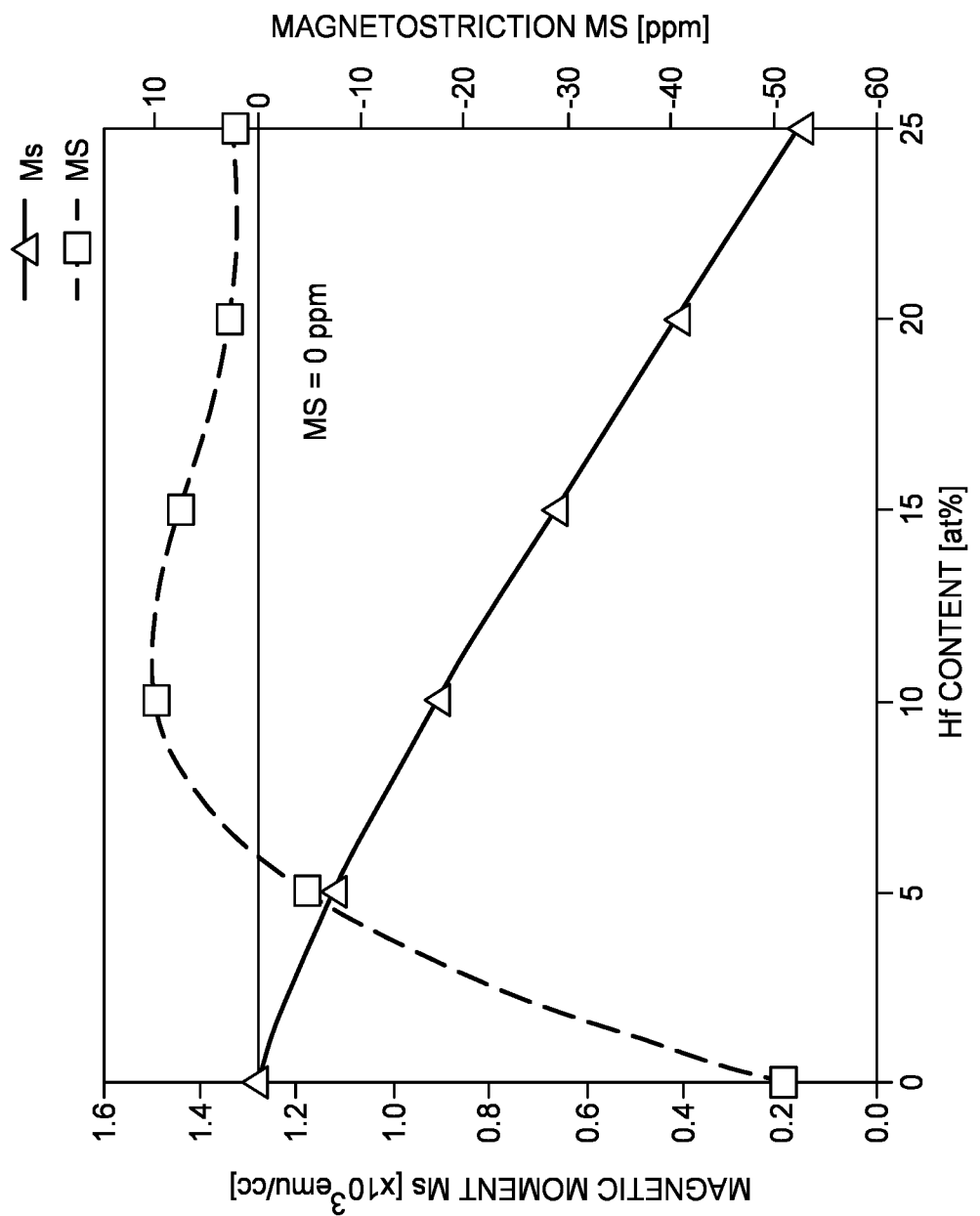
FIG. 8 is a chart of magnetic moment and magnetostriction in amorphous CoHf films as a function of Hf content in atomic percent.

The magnetic moment Ms (emu/cc) and magnetostriction MS (ppm) were measured for various samples of the ferromagnetic amorphous CoHf free layer with various atomic percent of Hf from zero up to about 25% in content and plotted on the chart of FIG. 8.

The samples showed that the amorphous CoHf layers were ferromagnetic with zero to 30 atomic percent (estimated) of Hf in content. Magnetic moment diminished at about 30 atomic percent of Hf in content. The amorphous CoHf layers with 30 atomic percent (estimated) of Hf and greater in content were non-ferromagnetic with a zero magnetic moment.

The samples showed that the CoHf layers had a very large negative magnetostriction with an Hf content of less than about 5 atomic percent, similar as shown in cobalt films. The samples showed that the ferromagnetic amorphous CoHf layers had a small positive magnetostriction with an Hf content of about 5 atomic percent and greater.

Example 3

Figure 9A:
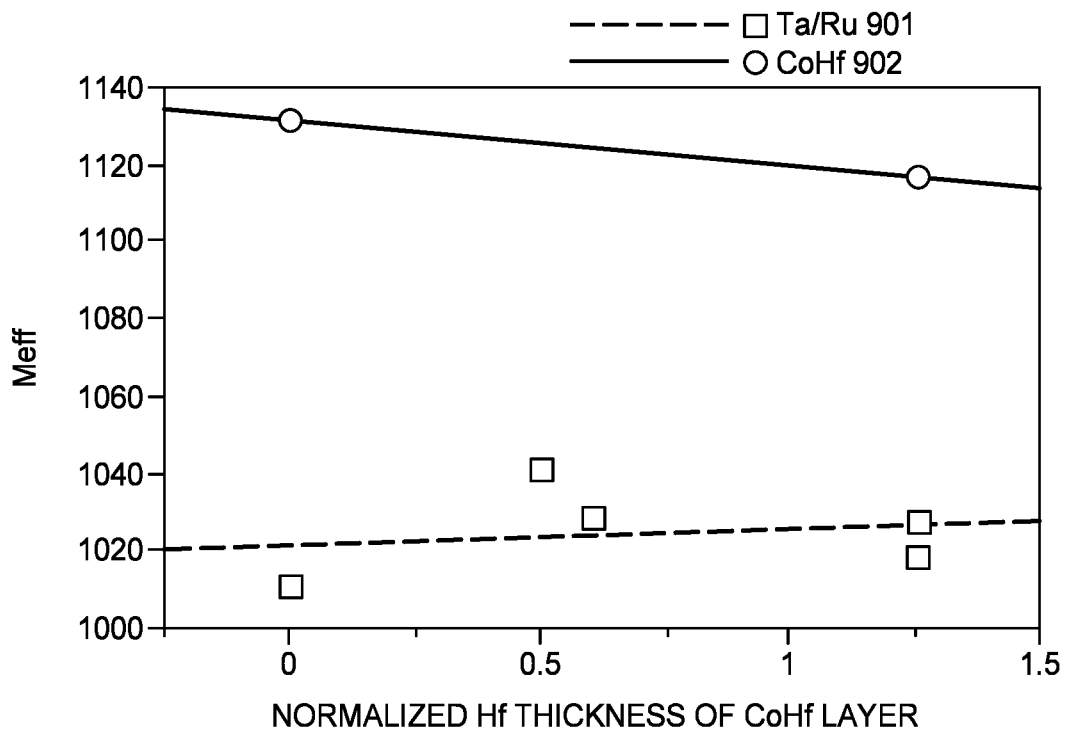
FIGS. 9A-9B are charts of the effective magnetic moment and the damping constant of various samples were measured by FMR.
Figure 9B:
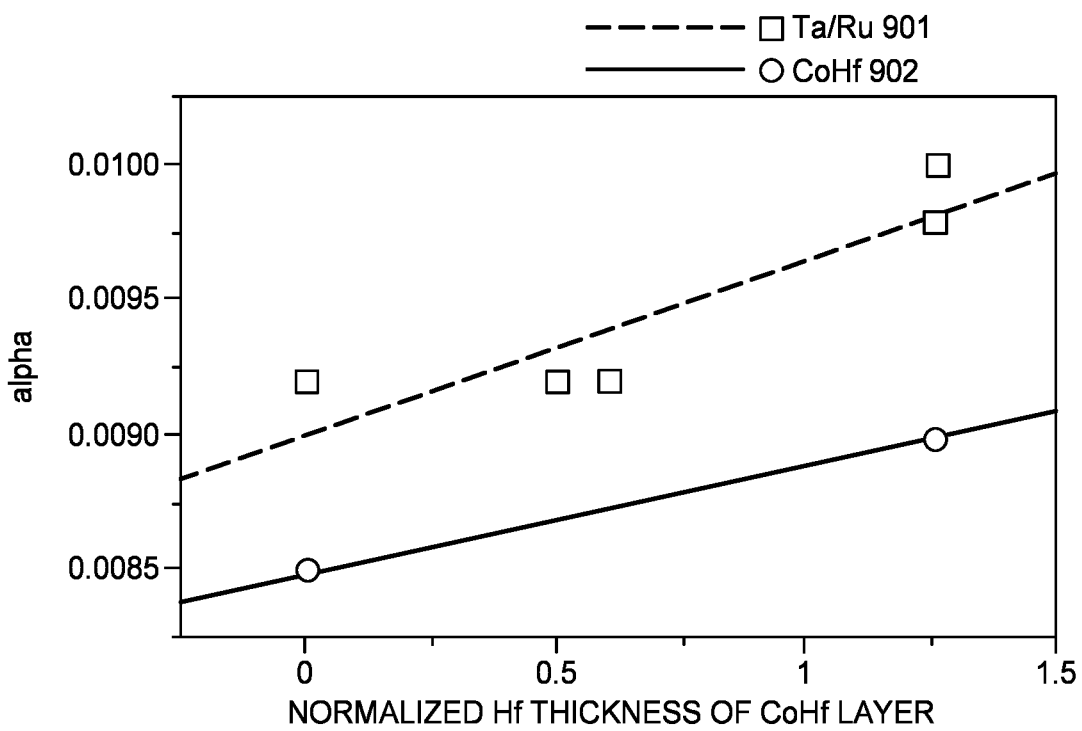

The effective magnetic moment (Meff, in emu/cc) and the damping constant (alpha) of various samples were measured by FMR with the applied field in the plane of a film over various normalized Hf thicknesses of the ferromagnetic amorphous CoHf insertion layer as shown in FIGS. 9A and 9B. The normalized Hf thickness of the ferromagnetic amorphous CoHf insertion layers is the measured CoHf layer thickness times the Hf content in atomic percentage. It described the magnetic properties and their changes with the ferromagnetic amorphous CoHf insertion layers having increasing Hf content or decreasing magnetic moment. Samples 901 and Samples 902 each comprised a dual free layer structure as shown in FIGS. 3 and 4. Samples 901 further included a buffer layer of a non-ferromagnetic stack of Ta/Ru and a capping layering of a non-ferromagnetic stack of Ru/Ta. Samples 902 further included a buffer layer of non-ferromagnetic amorphous CoHf and a first capping layer of non-ferromagnetic amorphous CoHf combined with a second capping layer of Ru/Ta.

In the set of Samples 901 and 902, magnetic moment showed to increase by about 10% in the free layers and dual free layer structures irrespective of the insertion of ferromagnetic amorphous CoHf layer in the free layers, with non-ferromagnetic amorphous CoHf buffer and capping as compared to those having crystalline Ta/Ru buffers and capping layers. The measured values of the effective magnetic moment from FMR were fairly close to those obtained from static magnetic measurements of magnetization of the free layers. The enhancement of magnetic moment was closely associated with possible migration or redistribution of boron element within and/or across those sublayers of the free layers containing Co(Fe)B. In Samples 902, the non-ferromagnetic amorphous CoHf buffer and capping layer sandwiched the entire core structures of dual free layers, providing a kind of sink for boron element to redistribute out of the free layers and that helped increase magnetic moment of the free layers. This was similar in effect as observed in the examples in FIG. 8, in which the magnetic moment of CoHf layers was diluted against the increasing content of Hf or enhanced with the decreasing content of Hf. In Samples 902, the measured values of the effective magnetic moment showed to decrease slightly as the normalized Hf thickness of the ferromagnetic amorphous CoHf insertion layer or the content of Hf was increased due to such effects of dilution. These effects were however not appreciably evident in Samples 901 with the crystalline Ta/Ru buffer and capping layer.

In comparison to Samples 901, Samples 902 showed lower damping constants. This indicated non-ferromagnetic amorphous CoHf buffer and capping layer yielded smaller damping constant as compared with Ta/Ru buffer layer and Ru/Ta capping layer. Samples 902 were featured with their dual free layer structures more coherently grown and textured, robustly integrated, and more thermally stable. The reduced inhomogeneities in local or layer structures would contribute to a decrease in the half peak width in resonance, and then the damping constant of the dual free layers. Following the relationship that describes magnetic signal-to-noise ratio (SNR) of a read sensor, SNR is proportional to the root square of the ratio of the (effective) magnetic moment to the damping constant in DFL devices. Devices formed from Samples 902 would deliver higher magnetic SNR than devices formed from Samples 901.

Example 4

Figure 10A:
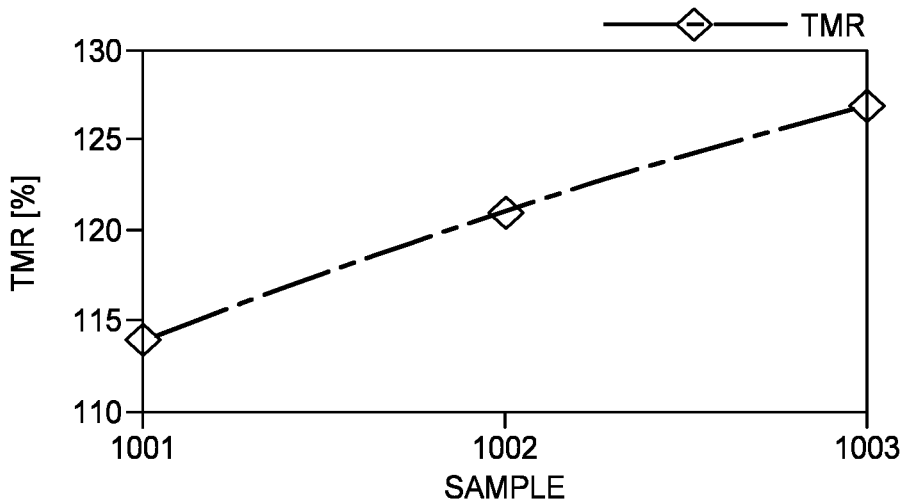
FIGS. 10A-10B are charts of the device TMR ratio, magnetic moment Mst, and coercivity Hc of various dual free layers.
Figure 10B:
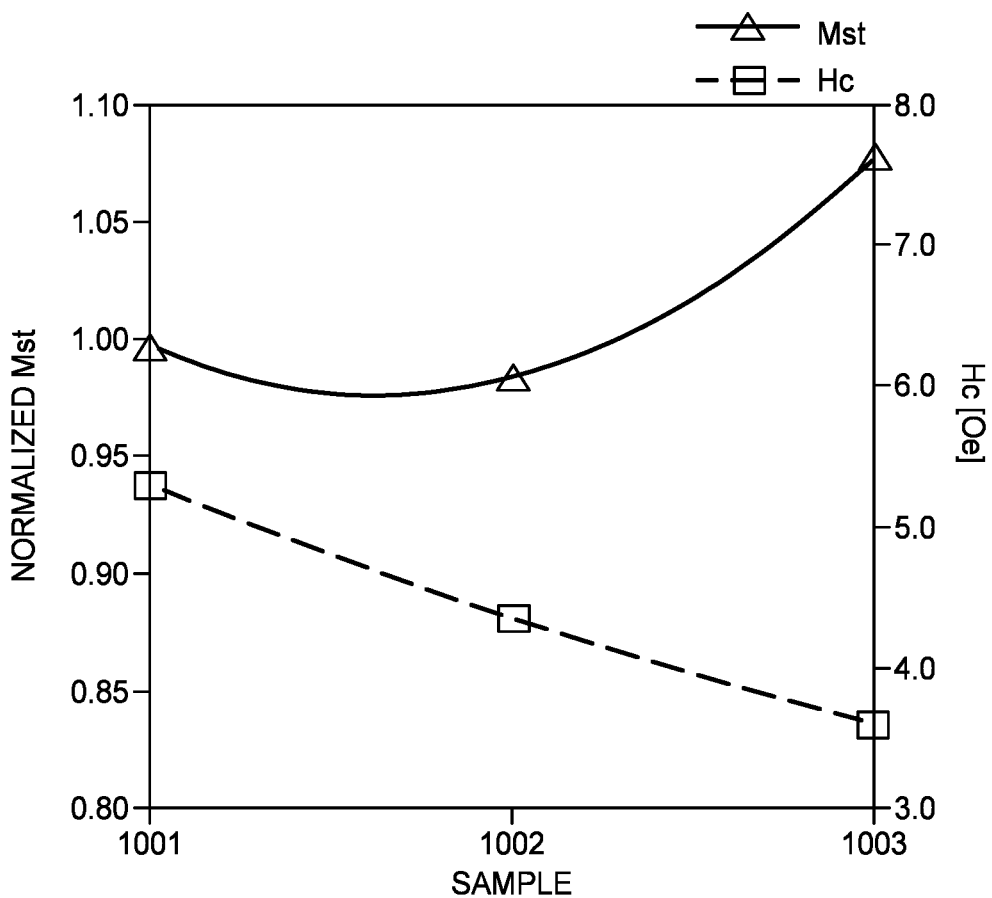

TMR ratio (%), magnetic moment Mst, and coercivity Hc in devices with a resistance area of about 0.4 $\Omega\mu m^2$ were measured for different DFL reader sensors as shown in FIGS. 10A-10B. Sample 1001 was the baselined CoB bilayer DFL with CoFe interface layers to the barrier layer. Sample 1002 was the CoB bilayer DFL having CoFe interface layers to the barrier layer, ferromagnetic amorphous CoHf insertion layers between the CoB bilayers, a crystalline Ta/Ru buffer layer, and a crystalline Ru/Ta capping layer (refer to FIG. 3). Sample 1003 was a CoB bilayer DFLs having CoFe interface layers to the barrier layer, ferromagnetic amorphous CoHf insertion layers between the CoB bilayers, a non-ferromagnetic amorphous CoHf buffer layer, and a non-ferromagnetic amorphous CoHf capping layer combined with a second crystalline Ru/Ta capping layer (refer to FIG. 4). Sample 1003 showed still higher TMR ratio (%) signal than Sample 1002 which showed higher TMR (%) signal than sample 1001. Sample 1001 to 1003 were with adjustable and low device magnetostriction at about +5.0 ppm and less for the dual free layer structures.

In comparison to Sample 1001, Sample 1002 and Sample 1003 (and variations thereof) were more coherently grown and textured, robustly integrated, and more thermally stable. These samples outperformed Sample 1001 in general in magnetic properties of the free layers, in addition to their increased thermal stability and process robustness against corrosion. In the set of Sample 1001 to 1003, magnetic coercivity Hc showed to decrease in the free layers and dual free layer structures with ferromagnetic amorphous CoHf insertion layers in the free layers. The reduction of Hc is significant, and the measured Hc of less than 4 Oe is fairly close to those values of 3.5-4.5 Oe from standard soft magnetic NiFe materials. The magnetic moment in the dual free layer structures showed similar but somewhat smaller in Sample 1002 than in Sample 1001. This quantity in Sample 1003 however showed to increase by 8.0% when it is compared to Sample 1001, or by 10.0% when compared to Sample 1002 similarly with the ferromagnetic amorphous CoHf insertion layers in the free layers.

In Sample 1003, the output amplitude showed to increase by almost half as compared to Sample 1001, given that TMR ratio (%) in device increased by about 10%. This unproportioned enhancement in amplitude was in part closely related to coherent texture in dual free layer structures, robust/integrated device structures and increased thermal stability and process robustness against corrosion. In addition, it was in part attributed to increased reader sensor stabilization due to overall optimized and/or balanced magnetic properties in the dual free layer structures, and due the provided/additional flexibility and mechanism of adjustable interlayer coupling between sublayers in the free layers. Consequently Sample 1003 provided higher field sensitivity, and QSNR. In quasi-static magnetic test, Sample 1002 showed increased performance or 1.0 dB gain, while Sample 1003 outstood and demonstrated roughly 2.0 dB gain over the baseline process or Sample 1001, or 1.0 dB gain over Sample 1002 in QSNR.

While the foregoing is directed to embodiments of the present disclosure, other and further embodiments of the disclosure may be devised without departing from the basic scope thereof, and the scope thereof is determined by the claims that follow.

What is claimed is:

1. A magnetic element, comprising:
  a first free layer, the first free layer comprising:
    a first ferromagnetic bilayer selected from CoB, CoFeB, FeB, and combinations thereof; and
    a first amorphous insertion layer between the first ferromagnetic bilayer;
  a barrier layer over the first free layer; and
  a second free layer over the barrier layer, the second free layer comprising:
    a second ferromagnetic bilayer selected from CoB, CoFeB, FeB, and combinations thereof; and
    a second amorphous insertion layer between the second ferromagnetic bilayer;
  wherein each of the first and second amorphous insertion layers independently has a recrystallization temperature of about 300° C. and above.

2. The magnetic element of claim 1, wherein the first free layer further comprises a first ferromagnetic interface layer interfacing the barrier layer and the first ferromagnetic bilayer;
  wherein the second free layer further comprises a second ferromagnetic interface layer interfacing the barrier layer and the second ferromagnetic bilayer; and
  wherein the first ferromagnetic interface layer and the second ferromagnetic interface layer each independently comprises a material selected from CoFe, Co, and Fe.

3. The magnetic element of claim 1, wherein each of the first amorphous insertion layer of the first free layer and the second amorphous insertion layer of the second free layer independently is a ferromagnetic material comprising:
  an alloy of one or more transition metals of Co, Fe, Ni, other transition metals, or one or more combinations thereof with one or more amorphous forming elements of Ta, Zr, Hf, W, Ti, C, P, B, Si, Nb, or one or more combinations thereof,
  wherein the alloy comprises the one or more amorphous forming elements from more than 0 atomic percent to less than 30 atomic percent in content.

4. The magnetic element of claim 3, wherein each of the first amorphous insertion layer of the first free layer and the second amorphous insertion layer of the second free layer independently is CoHf having an atomic percent of Hf from about 5 to about 30%.

5. The magnetic element of claim 1, wherein each of the first amorphous insertion layer of the first free layer and the second amorphous insertion layer of the second free layer independently is non-ferromagnetic and comprises an amorphous material selected from a group consisting of Ta, Zr, Hf, W, Ti, C, P, B, Si, Nb, multiple layers thereof, and alloys thereof.

6. The magnetic element of claim 5, wherein:
  each of the first amorphous insertion layer of the first free layer and the second amorphous insertion layer of the second free layer independently is a non-ferromagnetic amorphous material comprising:
    one or more amorphous forming elements of Ta, Zr, Hf, W, Ti, C, P, B, Si, Nb, or one or more combinations thereof alone, or
    an alloy of Co, Fe, Ni, or one or more combinations thereof,
  wherein the first amorphous insertion layer and the second amorphous insertion layer independently comprise the one or more amorphous forming elements from about 30 atomic percent to about 100 atomic percent in content.

7. The magnetic element of claim 6, wherein each of the first amorphous insertion layer of the first free layer and the second amorphous insertion layer of the second free layer independently is CoHf having an atomic percent of Hf from more than about 30 to about 95% in content.

8. The magnetic element of claim 1, wherein the barrier layer is MgO.

9. The magnetic element of claim 1, wherein the first free layer is proximate a buffer layer and has a magnetostriction of about 5.0 ppm or less and wherein the magnetic element has an overall magnetostriction of less than 5.0 ppm.

10. A magnetic media drive comprising a read sensor comprising the magnetic element of claim 1.

11. A magnetic element, comprising:
  a buffer layer comprising a first non-ferromagnetic layer;
  a first free layer over the buffer layer, the first free layer comprising:
    a first ferromagnetic bilayer selected from CoB, CoFeB, FeB, and combinations thereof; and
    a first amorphous insertion layer between the first ferromagnetic bilayer;
  a barrier layer over the first free layer;
  a second free layer over the barrier layer, the second free layer comprising:
    a second ferromagnetic bilayer selected from CoB, CoFeB, FeB, and combinations thereof; and
    a second amorphous insertion layer between the second ferromagnetic bilayer; and
  a capping layer over the second free layer, the capping layer comprising a second non-ferromagnetic layer;
  wherein each of the first and second amorphous insertion layers independently has a recrystallization temperature of about 300° C. and above.

12. The magnetic element of claim 11, wherein each of the first non-ferromagnetic layer of the buffer layer and the second non-ferromagnetic layer of the capping layer is independently a crystalline material selected from a group consisting of Ta, Ti, Cr, Ru, Hf, Al, Cu, Ag, Au, W, alloys thereof, and multiple layers thereof.

13. The magnetic element of claim 11, wherein each of the first non-ferromagnetic layer of the buffer layer and the second non-ferromagnetic layer of the capping layer independently comprises an amorphous material selected from a group consisting of Ta, Zr, Hf, W, Ti, C, P, B, Si, Nb, combinations thereof, and alloys thereof.

14. The magnetic element of claim 13, wherein each of the first non-ferromagnetic layer of the buffer layer and the second non-ferromagnetic layer of the capping layer independently is an amorphous material comprising:
an alloy of one or more transition metals of Co, Fe, Ni, other transition metals or one or more combinations thereof with one or more amorphous forming elements of Ta, Zr, Hf, W, Ti, C, P, B, Si, Nb, or one or more combinations thereof,
wherein the amorphous material comprises the one or more amorphous forming elements from 30 atomic percent to about 100 atomic percent in content.

15. The magnetic element of claim 14, wherein the buffer layer and the capping layer each independently comprises CoHf having an atomic percent of Hf from more than about 30 to about 95% in content, wherein the capping layer comprises a non-ferromagnetic amorphous CoHf layer alone or in combination with a Ru/Ta or Ru/Ta/Ru layer on the non-ferromagnetic amorphous CoHf layer.

16. A magnetic media drive comprising a read sensor comprising the magnetic element of claim 11.

17. A magnetic element, comprising:
a ferromagnetic seed layer;
a non-ferromagnetic buffer layer over the ferromagnetic seed layer;
a first free layer over the non-ferromagnetic buffer layer, the first free layer comprising:
 a first ferromagnetic bilayer selected from CoB, CoFeB, FeB, and combinations thereof; and
 a first amorphous insertion layer between the first ferromagnetic bilayer;
a barrier layer over the first free layer;
a second free layer over the barrier layer, the second free layer comprising:
 a second ferromagnetic bilayer selected from CoB, CoFeB, FeB, and combinations thereof; and
 a second amorphous insertion layer between the second ferromagnetic bilayer; and
a capping layer over the second free layer, the capping layer comprising a non-ferromagnetic layer;
wherein each of the first amorphous insertion layer and the second amorphous insertion layer independently has a recrystallization temperature of about 300° C. and above.

18. The magnetic element of claim 17, wherein the ferromagnetic seed layer comprises at least one layer of a crystalline material selected from a group consisting of transition metal Co, Fe, Ni, other suitable transition metals, combinations thereof, and alloys thereof.

19. The magnetic element of claim 17, wherein the ferromagnetic seed layer is an amorphous material comprising an alloy of one or more transition metals of Co, Fe, Ni, other suitable transition metals, or one or more combinations thereof with one or more amorphous forming elements of Ta, Zr, Hf, W, Ti, C, P, B, Si, Nb, or one or more combinations thereof, wherein the alloy comprises the one or more amorphous forming elements from more than 0 atomic percent to less than 30 atomic percent in content.

20. The magnetic element of claim 17, wherein the ferromagnetic seed layer comprises at least one layer of a crystalline material selected from a group consisting of Co, Fe, Ni, and alloys thereof and at least one layer of an amorphous material comprising an alloy of one or more transition metals of Co, Fe, Ni, other suitable transition metals, or one or more combinations thereof with one or more amorphous forming elements of Ta, Zr, Hf, W, Ti, C, P, B, Si, Nb, or one or more combinations thereof, the alloy comprising the one or more amorphous forming elements from more than 0 atomic percent to less than 30 atomic percent in content.

21. The magnetic element of claim 17, wherein the ferromagnetic seed layer comprises CoHf having an atomic percent of Hf from about 5 to about 30% in content.

22. A magnetic media drive comprising a read sensor comprising the magnetic element of claim 17.

* * * * *